United States Patent
Lenguito

(10) Patent No.: US 12,129,053 B2
(45) Date of Patent: Oct. 29, 2024

(54) SATELLITE PROPELLANT TANK WITH INTEGRATED REGULATION

(71) Applicant: Maxar Space LLC, Westminster, CO (US)

(72) Inventor: Giovanni Lenguito, New York, NY (US)

(73) Assignee: Maxar Space LLC, Westminster, CO (US)

( * ) Notice: Subject to any disclaimer, the term of this patent is extended or adjusted under 35 U.S.C. 154(b) by 33 days.

(21) Appl. No.: 17/991,671

(22) Filed: Nov. 21, 2022

(65) Prior Publication Data
US 2023/0182928 A1 Jun. 15, 2023

Related U.S. Application Data

(60) Provisional application No. 63/289,768, filed on Dec. 15, 2021.

(51) Int. Cl.
| | |
|---|---|
| *B64G 1/40* | (2006.01) |
| *B33Y 80/00* | (2015.01) |
| *F02K 9/80* | (2006.01) |
| *B33Y 10/00* | (2015.01) |

(52) U.S. Cl.
CPC .............. *B64G 1/413* (2023.08); *B33Y 80/00* (2014.12); *B64G 1/402* (2013.01); *F02K 9/80* (2013.01); *B33Y 10/00* (2014.12)

(58) Field of Classification Search
CPC ........ B64G 1/413; B64G 1/402; B33Y 80/00; B33Y 10/00; F17C 13/06; F17C 2205/0308; F17C 2205/0311; F02K 9/80; F16H 2041/243

USPC ........... 220/4.12, 582, 581; 60/364; 137/259
See application file for complete search history.

(56) References Cited

U.S. PATENT DOCUMENTS

| | | | | |
|---|---|---|---|---|
| 2,019,004 | A * | 10/1935 | Endacott | F17C 1/00 220/581 |
| 3,318,073 | A * | 5/1967 | Adkins | B64G 1/402 55/459.1 |
| 6,131,858 | A * | 10/2000 | Dethienne | B64G 1/402 244/171.1 |
| 2004/0173624 | A1 * | 9/2004 | Carter | F24D 3/1008 220/720 |
| 2006/0144843 | A1 * | 7/2006 | Vandal | F17C 13/06 220/586 |
| 2017/0002978 | A1 * | 1/2017 | Ballinger | F17C 1/14 |

OTHER PUBLICATIONS

Eaton, "Valve in Tank Assembly (VITA) propulsion feed system," Technical Data, Aug. 2021, 2 pages.
Launcher, "Launcher Orbiter—Launcher Unveils Orbiter—Its Universal Orbital Transfer Vehicle and Satellite Platform," [https://launcherspace.com/orbiter], downloaded Dec. 9, 2021, 7 pages.

(Continued)

*Primary Examiner* — Robert J Hicks
(74) *Attorney, Agent, or Firm* — Vierra Magen Marcus LLP

(57) ABSTRACT

A satellite propellant tank includes a tank body and a dome attached to the tank body to enclose an interior volume for propellant storage. One or more cavities are formed in the dome. One or more propellant control components are located in the one or more cavities formed in the dome.

19 Claims, 15 Drawing Sheets

(56) References Cited

OTHER PUBLICATIONS

MacGlashan, W.F., Jr., Fill Valve Development for the Advanced Liquid Propulsion System (ALPS), Technical Report No. 32-875, National Aeronautics and Space Administration, Feb. 1, 1966, 23 pages.

\* cited by examiner

SATELLITE PROPELLANT TANK WITH INTEGRATED REGULATION

CROSS-REFERENCE TO RELATED APPLICATIONS

The present application claims the benefit of provisional patent application No. 63/289,768, filed on Dec. 15, 2021, which is incorporated by reference for all purposes.

BACKGROUND

The present disclosure relates to technology for satellite propellant storage and management system.

Satellites are widely used for a variety of purposes including communication, location (e.g., Global Positioning System, or GPS), and data gathering (e.g., directing sensors at the Earth including cameras, radar, laser, or other sensors). Different satellites may include different equipment according to the functions they are to fulfill. Satellites may be placed in orbit at different heights above the Earth and may be adapted for the location at which they are expected to operate. For example, Geostationary satellites may be different from Low Earth Orbit (LEO) satellites. In order to fulfill their functions, satellites may be maintained in a designated position with a designated orientation for long periods of time (e.g., throughout their working life) or change position and/or orientation one or more times. In some cases, a satellite may drift from its designated orbit and/or orientation and may be returned to its designated orbit and/or orientation by some movement of the satellite that may be linear (e.g., along x, y, z coordinates) and/or rotational (e.g., rotation about x, y, z coordinates). In some cases, a satellite may be moved in a linear and/or rotational manner to perform some new function (e.g., directing one or more antenna, sensor, or other component towards a different location). Satellites may be moved from their designated orbits at the end of their useful life. Such movement may be achieved using thrusters that are fired as required to achieve a specified movement. Propellant for one or more thrusters may be stored in a propellant tank.

DETAILED DESCRIPTION

Certain embodiments of the present technology described herein relate to satellites and to propellant systems used by thrusters (satellite thrusters) to move satellites while in space. Satellites may be moved for a variety of reasons while in space. A satellite may include thrusters configured to achieve such movement using a propellant. A propellant system may include a propellant tank that contains the propellant and a propellant control system that may include filters, pressure regulators, pressure transducers, inlet/outlet fittings, valves and/or other components to supply propellant at an appropriate pressure and flow rate to one or more thrusters (e.g., to ion thrusters that eject ions formed from propellant atoms at high velocities). Thrusters may be controlled by a control circuit which causes the thrusters to fire according to a thruster firing pattern in order to achieve a specified movement.

Examples of the present technology may include a propellant tank that is configured to accommodate one or more propellant control system components (e.g., one or more filters, pressure regulators, pressure transducers, inlet/outlet fittings and/or valves). These components may be integrated with a propellant tank. Such an arrangement may reduce the number of individual parts needed to build a propellant system, reduce manufacturing time, speed up testing and/or reduce failure risks (e.g., risk of leaks). In an example, additive manufacturing (e.g., 3-D printing) may be used to form portions of a propellant tank with cavities or chambers to facilitate integration of propellant system components (e.g., cavities integrated into the tank in which propellant system components can be located).

Prior to describing details of specific embodiments of the present technology, it is first useful to describe an exemplary wireless communication system with which embodiments of the present technology would be useful. An example of such a wireless communication system will now be described with reference to FIG. 1.

Figure 1:
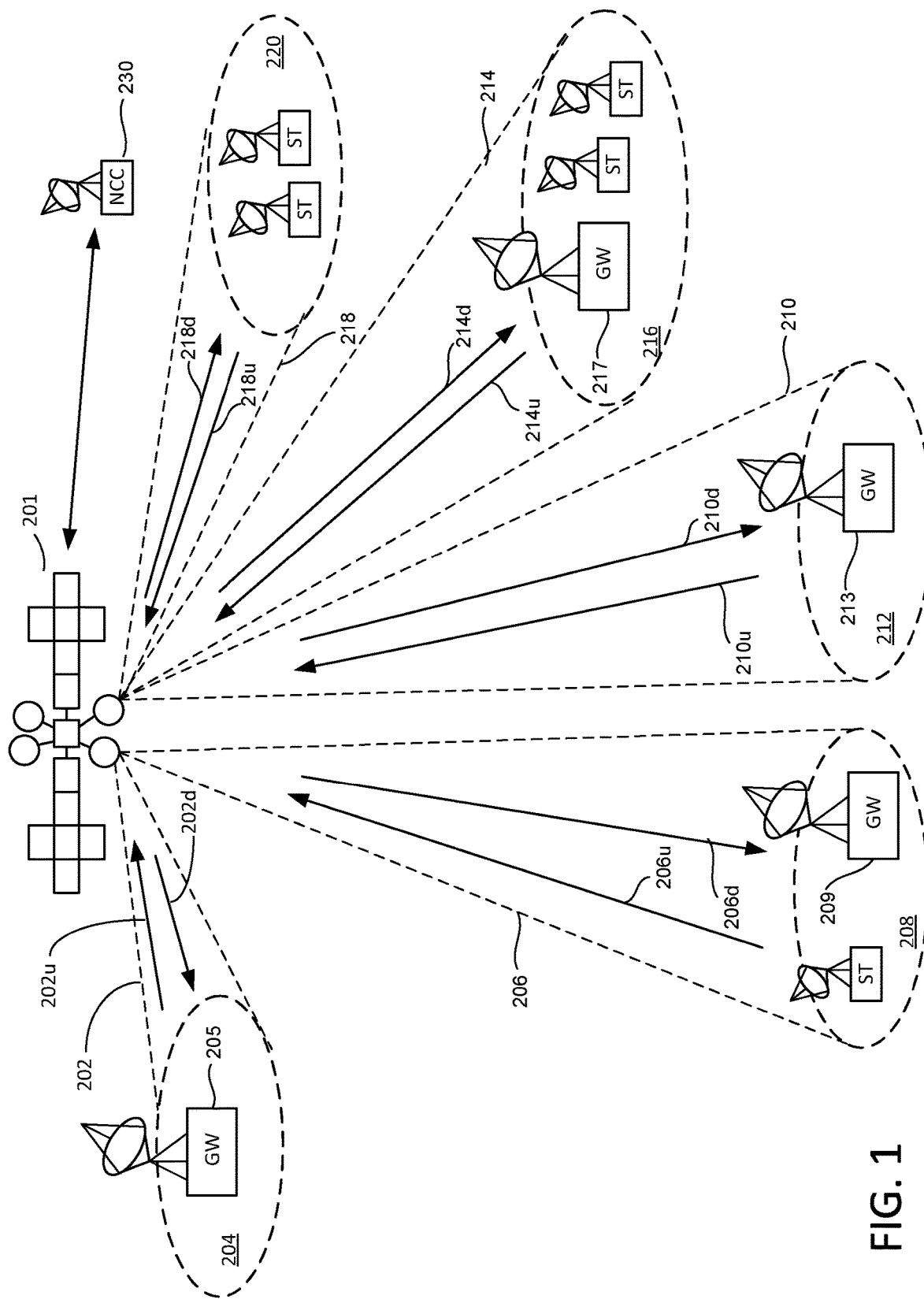
FIG. 1 is a block diagram describing a wireless communication system, which may be a satellite communication system.

FIG. 1 is a block diagram depicting a portion of a satellite communications system that includes one or more satellites. FIG. 1 depicts satellite 201, which may be a geostationary satellite or a non-geostationary satellite. A geostationary satellite moves in a geosynchronous orbit (having a period of rotation synchronous with that of the Earth's rotation) in the plane of the Equator, so that it remains stationary in relation to a fixed point on the Earth's surface. This orbit is often achieved at an altitude of 22,300 miles (35,900 km) above the earth; however, other altitudes can also be used. A non-geostationary satellite is a satellite that is not a geostationary satellite and is not in an orbit that causes the satellite to remain stationary in relation to a fixed point on the Earth's surface. Examples of non-geostationary satellites include (but are not limited to) satellites in Low Earth Orbits ("LEO"), Medium Earth Orbits ("MEO") or Highly Elliptical Orbits ("HEO"). Although FIG. 1 only shows one satellite, in some embodiments, the system will include multiple satellites that are referred to as a constellation of satellites, which may communicate with each other.

In one embodiment, satellite 201 comprises a bus (i.e., spacecraft) and one or more payloads, including a communications payload. The satellite may also include multiple power sources, such as batteries, solar panels, and one or more propulsion systems, for operating the bus and the payload. The satellite includes an antenna system that provides a plurality of beams, including non-articulated and steerable spot beams, for communicating with subscriber terminals, gateways and/or other satellites.

A subscriber terminal is a device that wirelessly communicates with a satellite, usually to be used by one or more end users. The term subscriber terminal may be used to refer to a single subscriber terminal or multiple subscriber terminals. A subscriber terminal is adapted for communication with the satellite communication system including satellite 201. Subscriber terminals may include fixed and mobile subscriber terminals including, but not limited to, a cellular telephone, wireless handset, a wireless modem, a data transceiver, a paging or position determination receiver, or mobile radiotelephone, a cellular backhaul, a trunk, an enterprise computing or storage device, an airborne device, a maritime device or a head end of an isolated local network. A subscriber terminal may be hand-held, portable (including vehicle-mounted installations for cars, trucks, boats, trains, planes, etc.) or fixed as desired. A subscriber terminal may be referred to as a wireless communication device, a mobile station, a mobile wireless unit, a user, a subscriber, a terminal or a mobile.

The term gateway may be used to refer to a device that communicates wirelessly with a satellite and provides an interface to a network, such as the Internet, a wide area network, a telephone network or other type of network. In some embodiments, gateways manage the subscriber terminals.

FIG. 1 also shows a Network Control Center 230, which includes an antenna and modem for communicating with satellite 201, as well as one or more processors and data storage units. Network Control Center 230 provides commands to control and operate satellite 201, as well as all other satellite communication payloads in the constellation. Network Control Center 230 may also provide commands to any of the gateways (via a satellite or a terrestrial network) and/or subscriber terminals.

In one embodiment, satellite 201 is configured to provide two hundred fixed (i.e., non-articulated so that they are fixed in relation to satellite 201) spot beams that use time domain beam hopping among the spot beams. In other embodiments, more or less than two hundred spot beams can be used for the time domain beam hopping. In one embodiment, the two hundred hopping beams are divided into thirty-six hopping groups such that one beam in each group is active at a given time; therefore, thirty-six of the two hundred spot beams are active at an instance in time. In addition to the two hundred non-articulated spot beams that perform time domain beam hopping, one embodiment of satellite 201 includes eight 4.2 degree steerable spot beams used to communicate with gateways. In other embodiments, more or less than eight can be used. Additionally, satellite 201 includes six 2.8 degree steerable spot beams which can have a dual purpose of communicating with gateways and/or providing high capacity communication for subscriber terminals that would otherwise fall under the hopping beams of the two hundred spot beams performing time domain beam hopping. Other embodiments can use different sized spot beams.

For example purposes only, FIG. 1 shows five spot beams: 202, 206, 210, 214 and 218. Spot beam 202 is a 4.2 degree steerable spot beam that illuminates coverage area 204 for communicating with one or more gateways 205 via downlink 202*d* and uplink 202*u*. Spot beam 206 is a 2.8 degree steerable dual-purpose beam that illuminates coverage area 208 in order to communicate with one or more gateways 209 and one or more subscriber Terminals ST via downlink 206*d* and uplink 206*u*. Spot beam 210 is a 2.8 degree steerable spot beam that could be used to communicate with gateways and/or subscriber terminals ST, but in the example of FIG. 1 spot beam 210 illuminates coverage area 212 to communicate with one or more gateways 213 via downlink 210*d* and uplink 210*u*. The two hundred spot beams that perform time domain beam hopping can be used to communicate with subscriber terminals and/or gateways. Spot beams 214 and 218 are two examples of the two hundred non-articulated spot beams that performed time domain beam hopping. Spot beam 214 illuminates coverage area 216 to communicate with one or more gateways 217 and one or more subscriber terminals ST via downlink 214*d* and uplink 214*u*. Spot beam 218 illuminates coverage area 220 to communicate with subscriber terminals ST via downlink 218*d* and uplink 218*u*.

Figure 2:
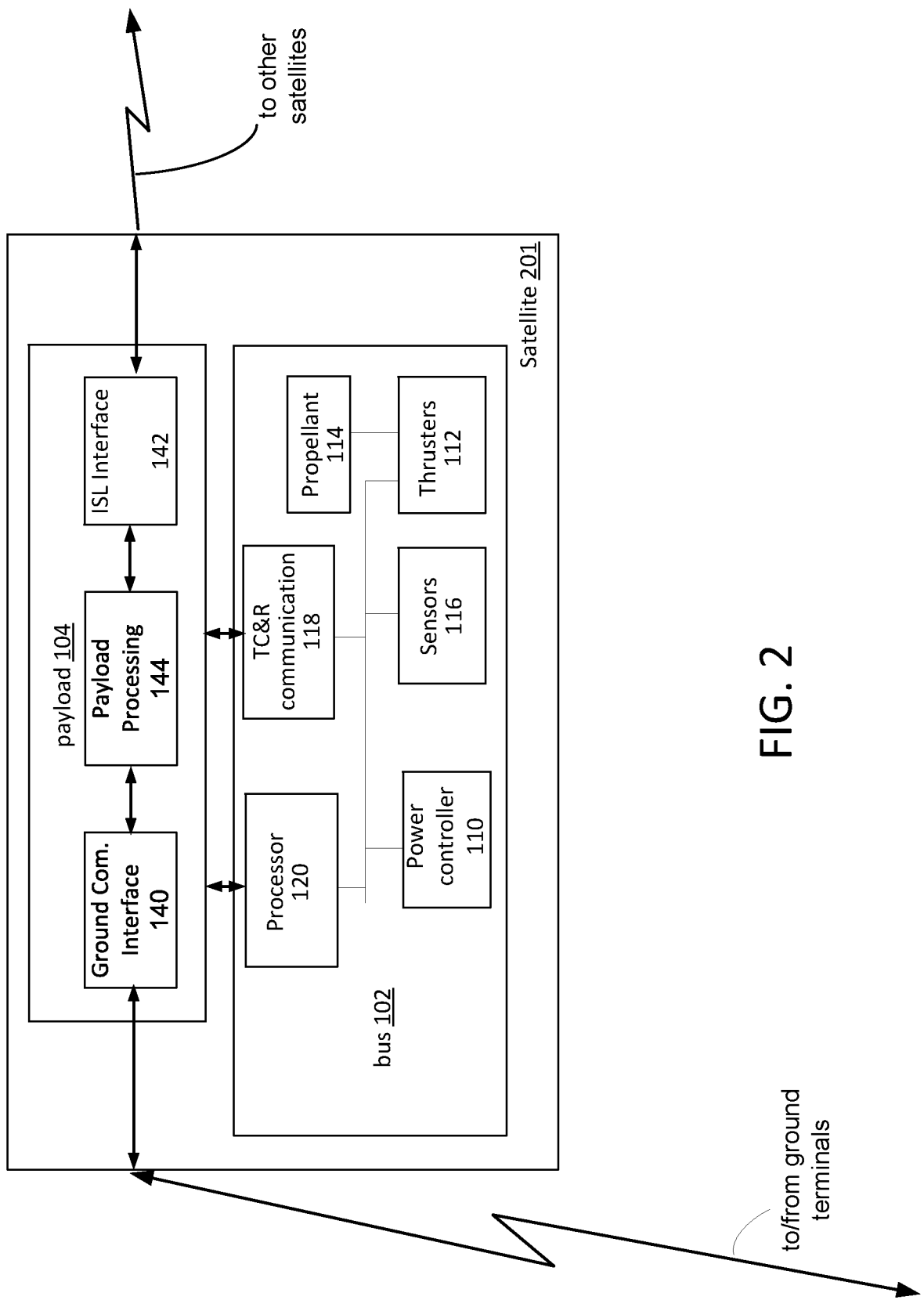
FIG. 2 depicts a portion of a satellite communication system.

FIG. 2 is a block diagram of one embodiment of satellite 201 of FIG. 1. In one embodiment, satellite 201 includes a bus 102 and a payload 104 carried by bus 102. Some embodiments of satellite 201 may include more than one payload. The payload provides the functionality of the communication and/or processing systems described herein.

In general, bus 102 is the spacecraft that houses the payload. For example, the bus components include a power controller 110, which may be connected to solar panels and one or more batteries (not shown in FIG. 2) to provide power to other satellite components; thrusters 112; propellant tank 114; sensors 116; telemetry, command and ranging (T, C & R) communication and processing equipment 118; and processor 120. Other equipment can also be included. Solar panels, batteries and power controller 110 are used to provide power to satellite 100. Thrusters 112 are used for changing the position or orientation of satellite 100 while in space. Propellant tank 114 supplies propellant for the thrusters 112. Sensors 116 are used to determine the position and orientation of satellite 100. T, C & R communication and processing equipment 118 includes communication and processing equipment for telemetry, commands from the ground to the satellite and ranging to operate the satellite. Processor 120 is used to control and operate satellite 201. An operator on the ground can control satellite 201 by sending commands via T, C & R communication and processing equipment 118 to be executed by system processor 120. For example, in response to a command, T, C & R communication and processing equipment 118 may cause one or more of thrusters 112 to fire, which may cause propellant from propellant tank 114 to flow to the selected thrusters. Some embodiments include a Network Control Center that wirelessly communicates with T, C & R communication and processing equipment 118 to send commands and control satellite 201. In one embodiment, processor 120 and T, C & R communication and processing equipment 118 are in communication with payload 104.

In one embodiment, the payload 104 includes an antenna system (not depicted in FIG. 2) that provides a set of one or more beams (e.g., spot beams) comprising a beam pattern used to receive wireless signals from ground stations and/or other satellites, and to send wireless signals to ground stations and/or other satellites. Payload 104 also includes payload components such as Ground Communication Interface 140, Inter-satellite Communication Interface 142 and Payload Processing System 144. Ground Communication Interface 140, which is connected to the antenna system (not depicted), is configured to communicate with one or more ground terminals (e.g., send and receive messages to/from gateways and/or subscriber terminals). Inter-satellite Communication Interface 142, which is connected to the antenna system, is configured to communicate with other satellites, e.g., via an in-space network.

Figure 3:
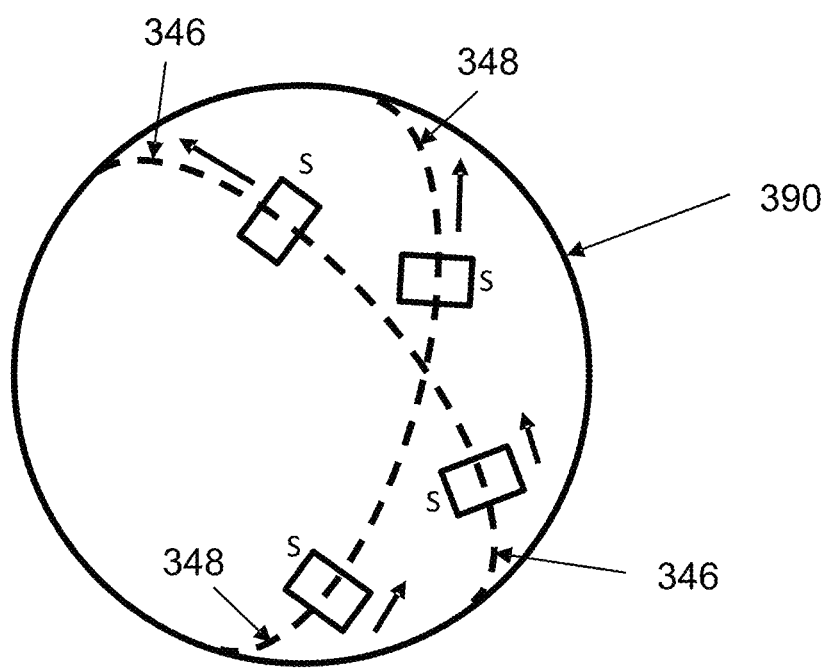
FIG. 3 shows an example of a satellite constellation orbiting the earth.

FIG. 3 depicts a constellation of satellites S in orbit around the Earth 390. In one embodiment, each of the satellites of the constellation depicted in FIG. 3 can be Low Earth Orbit (LEO) satellites. (In other embodiments, the satellites can be Medium Earth Orbit (MEO) satellites. Other types of satellites (and other distances from the earth) can also be used including Geostationary or Geosynchronous (GEO) satellites.) Surrounding the Earth 390 are a set of planes such as planes 346 and 348 shown in FIG. 3 (just two planes are shown for clarity, it will be understood that any suitable number of planes may be provided), each representing an orbit around the Earth. FIG. 3 also shows a plurality of satellites S representing the constellation of satellites. Each satellite of the constellation is orbiting the Earth 390 in one of the planes 346, 348. In one embodiment, the constellation of satellites S includes satellite 201 of FIG. 2. The arrangement of planes 346, 348 and other planes (not shown) may provide continuous coverage of the entire Earth, or a substantial portion of the Earth (e.g., omitting Arctic and Antarctic regions). Planes may form "streets of coverage" with satellites following each other as they orbit so that before a satellite disappears from view another satellite appears over the horizon.

The satellites S of the constellation depicted in FIG. 3 may be configured to wirelessly communicate with other satellites (e.g., neighbors) and/or ground terminals and/or gateways. Satellites S may be configured to gather data from antennas or sensors directed towards the Earth (e.g., cameras, or radiation detectors at any wavelength, infrared, radar, etc.). Satellites S may be configured to generate signals used to determine location (e.g., GPS) or other purposes.

A satellite S may be launched from Earth and placed in a desired orbit with a desired orientation to perform its function or functions (e.g., to maintain coverage of a designated area or areas as illustrated in FIG. 2). Over time, a satellite may drift from its desired orbit and/or orientation so that it can no longer perform its function(s) in a satisfactory manner. One or more thrusters (e.g., thrusters 112) may be provided to move such a satellite back to its desired orbit and/or orientation. Such thrusters may be fired according to a thruster firing pattern that is calculated to produce a specified movement to return the satellite to its desired orbit and/or orientation (orbital station-keeping).

In some cases, a satellite's desired orbit and/or orientation may change after it is launched (e.g., to perform some new function or to orient one or more satellite components towards a new target). Such a change or may require a movement of the satellite and a corresponding specified movement may be calculated and corresponding thruster firing pattern selected to achieve the specified movement (orbital maneuver).

In some cases, a service satellite may be used to service a target satellite to provide some external intervention. For example, a service satellite may dock with a target satellite so that it can refuel the target satellite (e.g., provide propellant and/or electrical current) and/or perform repair/replacement of components of the target satellite. In some cases, a service satellite may attach to a target satellite and may move the target satellite in a linear and/or rotational manner. In order to achieve a successful docking of a service satellite and target satellite, accurate movement of one or both may be required (e.g., to avoid damaging impact and/or misalignment, relative movement may be finely controlled).

The above examples of satellite movement (e.g., for returning to a desired orbit and/or orientation, changing to a new orbit and/or orientation, and facilitating docking of two or more satellites) should not be construed as limiting and the present technology may be applied to movement of a satellite or other spacecraft for any purpose.

Figure 4:
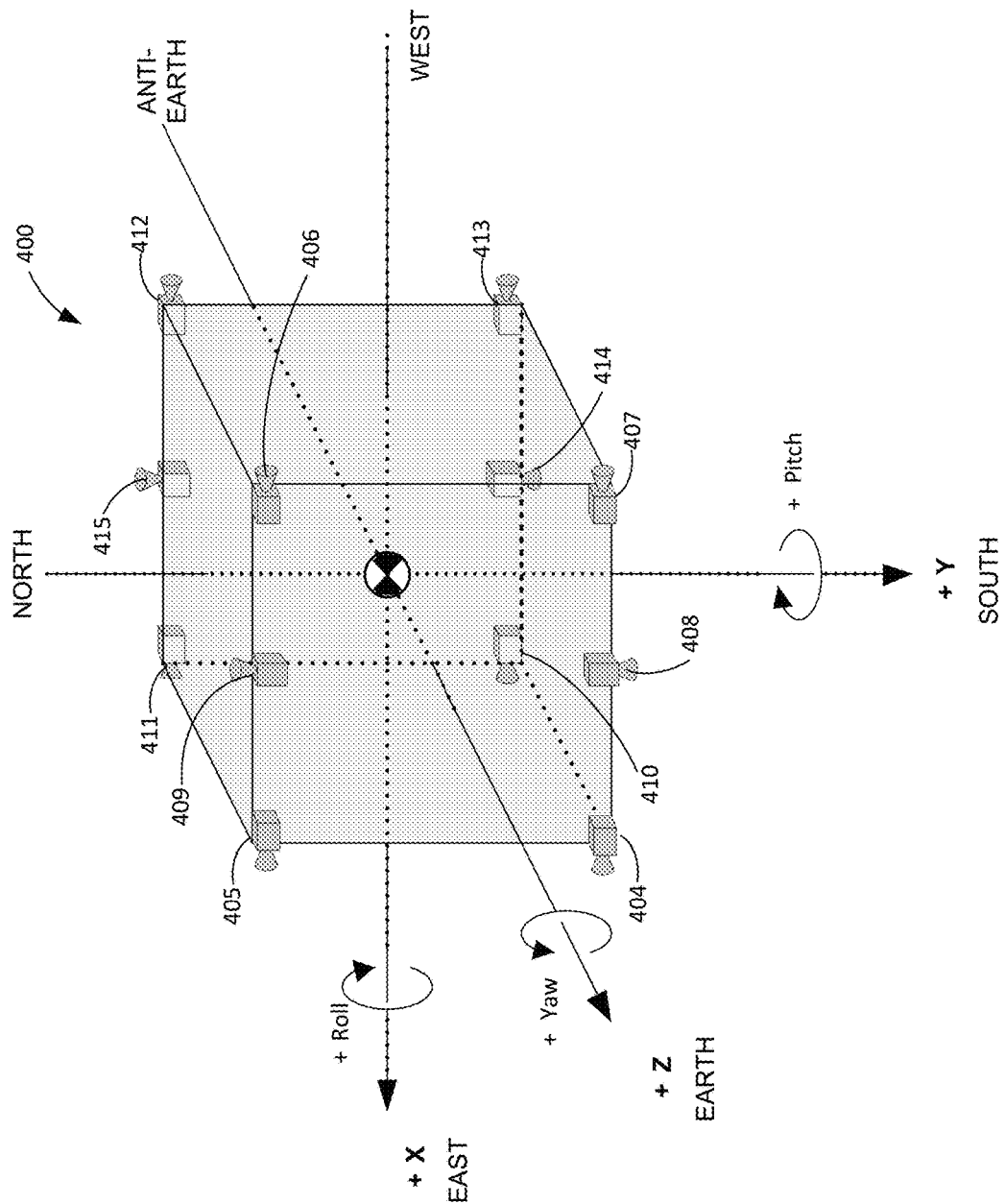
FIG. 4 shows an example of a satellite with thrusters.

FIG. 4 illustrates an example of a satellite 400 that includes a plurality of thrusters to facilitate movement of satellite 400, including linear movement and rotational movement. Satellite 400 is illustrated as a cube for simplicity (the present technology is not limited to any particular satellite shape or configuration and is not limited to a cube satellite or "CubeSat"). Thrusters may be physically attached to a frame, housing, or other component of satellite 400 so that force generated by thrusters results in movement of satellite 400.

Satellite 400 is shown in perspective view with the X-direction extending across the view shown from right to left (with the +X to the left). The X-direction is along the west to east direction in this example (e.g., parallel to a line of latitude). The Y-direction extends downwards in this view (with +Y towards the bottom). The Y-direction is along the north to south direction in this example (e.g., parallel to a line of longitude). The Z-direction extends generally from back to front in this view (with +Z towards the front). The Z-direction is along the anti-earth to earth direction in this example (e.g., directed towards the center of the earth). Movement along any combination of the X, Y, and/or Z directions (west-east, north-south, and/or earth/anti-earth) may be considered linear motion. Arrows indicating the X-direction, Y-direction, and Z-direction intersect in the center of satellite 400 in this example and these arrows also correspond to X, Y, and Z axes respectively for purposes of describing rotational movement. For example, rotation about the X-axis may be referred to as "roll," rotation about the Y-axis may be referred to as "pitch," and rotation about the Z-axis may be referred to as "yaw." Satellite 400 may experience linear movement in one or more of the three dimensions (along X, Y, Z directions) illustrated and rotational movement about any of the three axes illustrated (about X, Y, Z axes) so that satellite may be considered to have six degrees of freedom (6 DOF).

Twelve thrusters are provided to implement linear and rotational movement of satellite 400 (e.g., to provide movement with six degrees of freedom) in this example. Four thrusters are located at vertices of satellite 400 at corners of an earth-facing side, with east-facing thruster 404 at the southeast corner, east-facing thruster 405 at the northeast corner, west-facing thruster 406 at the northwest corner, and west-facing thruster 407 at the southwest corner. In addition, south-facing thruster 408 is located midway along the south edge and north-facing thruster 409 is located midway along the north edge of the earth-facing side. A similar arrangement is provided on the opposite side (anti-earth side) with east-facing thruster 410 at the southeast corner, east-facing thruster 411 in the northeast corner, west-facing thruster 412 in the northwest corner, and west-facing thruster 413 in the southwest corner. In addition, south-facing thruster 414 is located midway along the south edge and north-facing thruster 415 is located midway along the north edge of the anti-earth face. The number, locations, and orientations of thrusters in FIG. 4 are provided as an example and it will be understood that any suitable number of thrusters may be arranged in different locations and orientations according to the present technology. Furthermore, while satellite 400 is shown in a particular orientation, it will be understood that satellite 400 may be rotated to have a different orientation which may provide different thruster orientations (e.g. changing pitch by 90 degrees may bring thrusters 406, 407, 412, 413, which are shown as west-facing, into an earth-facing orientation).

Thrusters 404-415 may be controlled to achieve a specified movement of satellite 400, which may include linear and/or rotational movement. Suitable control circuits may be connected to thrusters 404-415 to provide signals to cause thrusters 404-415 to fire in a thruster firing pattern to thereby produce thrust that achieves the specified movement.

Figure 5:
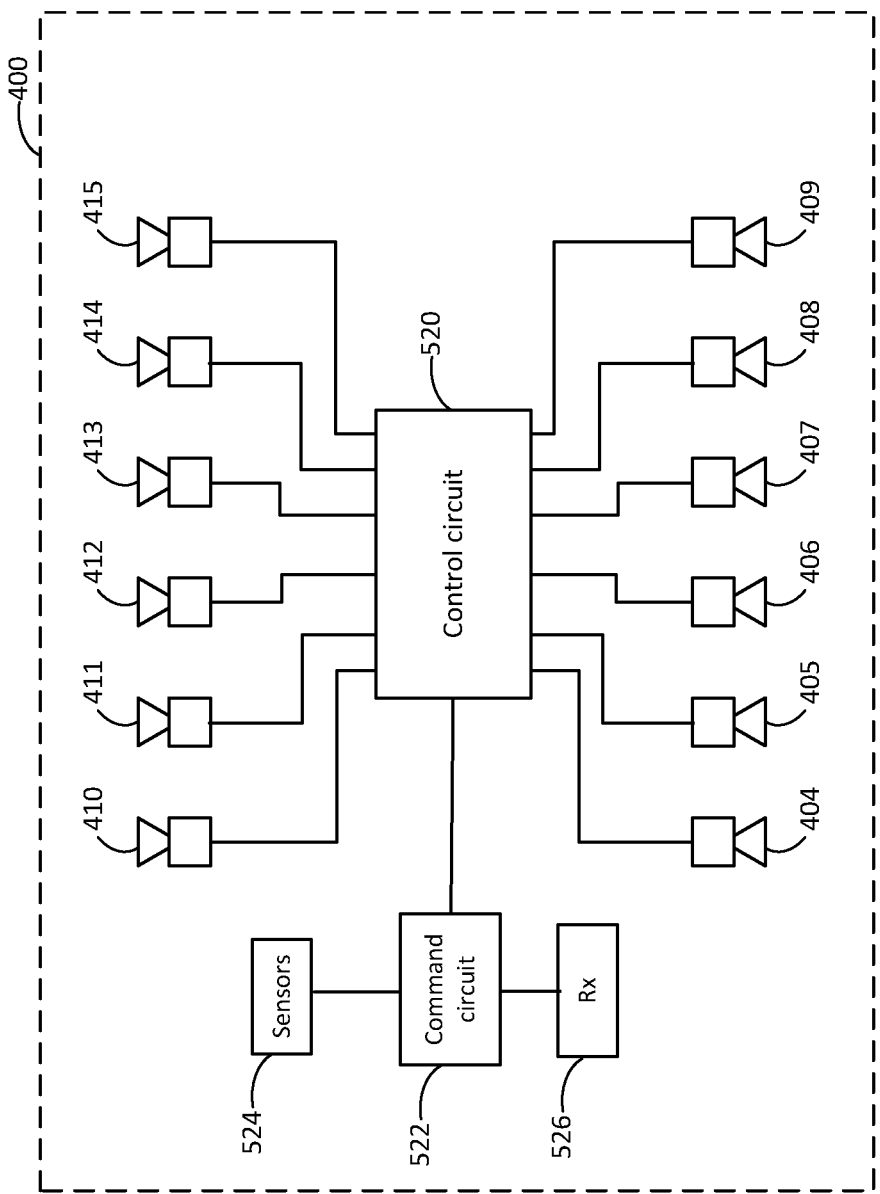
FIG. 5 shows aspects of a satellite with thrusters and corresponding control circuits.

FIG. 5 shows a schematic illustration of thrusters 404-415 connected to control circuit 520 in satellite 400. Control circuit 520 is also connected to command circuit 522, which sends commands to control circuit 520. For example, command circuit 522 may send a command that includes a specified movement including specified changes in position and/or orientation. For example, command circuit 522 may receive positional information from sensors 524 (e.g., gyroscopic or other sensors for location/orientation sensing) and may use such positional information to determine what movement or movements would achieve a desired position, velocity, orientation and/or rotational orientation and/or rotational velocity. For example, command circuit 522 may calculate a trajectory for satellite 400 to change its location and/or orientation and may generate a series of commands to achieve such a trajectory with each command including a specified movement. Command circuit 522 is also connected to receiver 526 and may receive input from an external source (e.g., from a ground station or another satellite) that it may use to determine what movement is needed. For example, the location and/or orientation of a satellite may be monitored from earth and corresponding location/orientation information may be sent to receiver 526. Receiver 526 may also receive a signal from another satellite. For example, where a service satellite is to dock with a target satellite, signals may be exchanged to facilitate docking (e.g., signals with respective position/orientation information). In some cases, command circuit 522 may send commands infrequently (e.g., only when some deviation from a desired location/orientation is detected). In some cases, command circuit 522 may send commands frequently (e.g., when accurate maneuvering is needed for docking with another satellite or for another purpose). Sensors 524 and/or receiver 526 may provide data regarding location/position frequently to provide rapid feedback so that new commands are generated to reflect up-to-date data.

When control circuit 520 receives a command from command circuit 522 with a specified movement for satellite 400, it may select a thruster firing pattern for thrusters 404-415 to achieve the specified movement. A thruster firing pattern may include firing one or more thruster for selected periods of time to generate thrust to cause the specified movement. Because propellant is generally limited on a satellite, it is generally desirable to select a firing pattern that is propellant efficient and an appropriate thruster firing pattern may be selected for propellant efficiency, which may make selection of a thruster firing pattern more challenging.

Figure 6B:
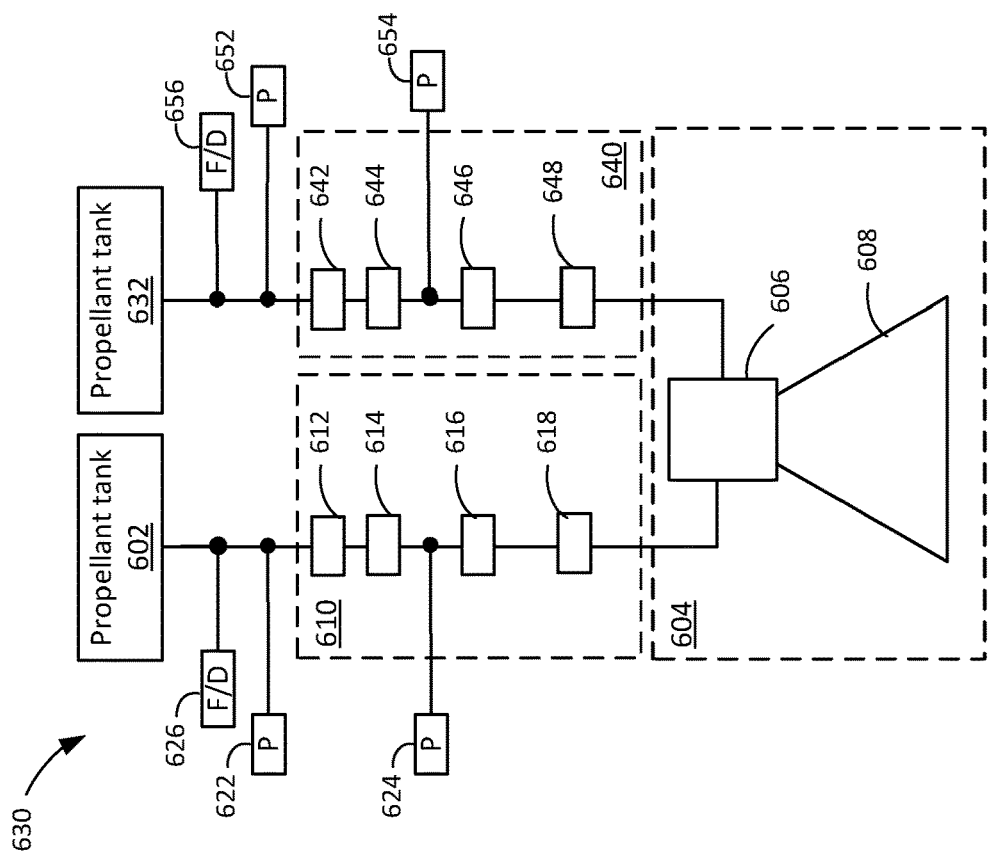
FIGS. 6A-B show examples of satellite thruster systems that include propellant tank(s).
Figure 6A:
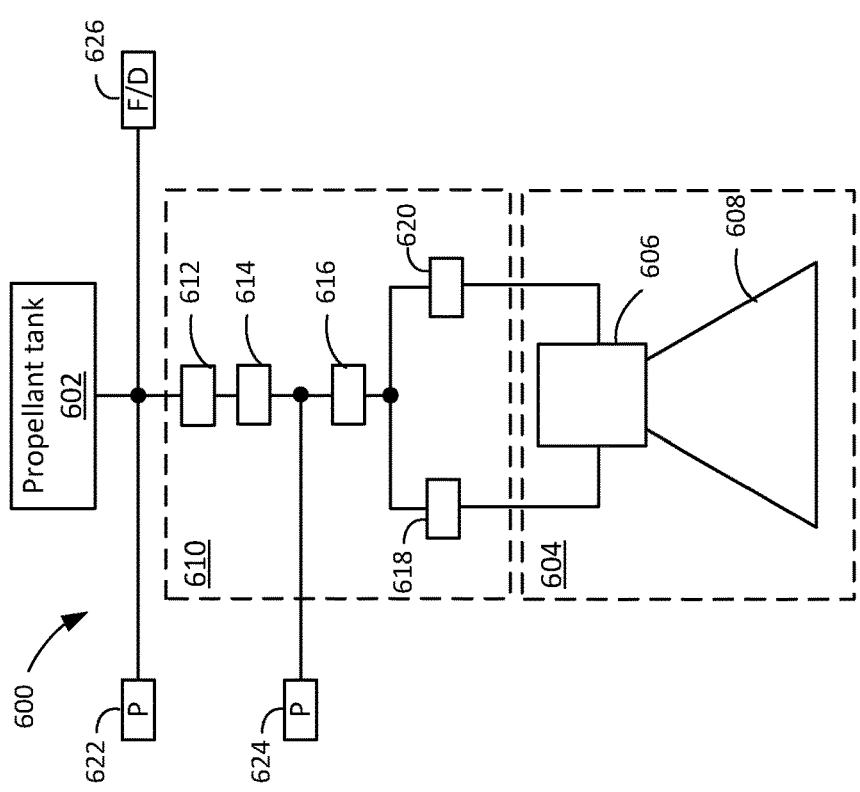

FIG. 6A illustrates an example of a single-propellant thruster system 600 in schematic form (e.g., any of thrusters 404-415). Thruster system 600 includes a propellant tank 602 that supplies propellant for thruster assembly 604. Thruster assembly 604 includes chamber 606 and nozzle 608 in this example. In an ion thruster, chamber 606 may be a discharge chamber that contains electrodes, and the propellant may be an inert gas such as xenon, krypton or argon (while referred to as a "gas" here, the propellant may be pressurized to a high pressure so that it may be in liquid form in propellant tank 602). In other types of thrusters, chamber 606 may have other features. Propellant flows from propellant tank 602 to thruster assembly 604 through propellant control assembly 610. Propellant control assembly 610 includes various propellant control components in-line along a propellant flow pathway between propellant tank 602 and thruster assembly 604 such as a filter 612, pressure regulator 614, valve 616 and orifices 618, 620. In general, propellant flows through filter 612, which removes particles that might impact other components, then through pressure regulator 614, which steps down (reduces) pressure of the propellant from the pressure of propellant tank 602 to some lower (reduced) pressure that is supplied to valve 616. Valve 616 may be switchable between an "on" or "open" setting that allows propellant to flow towards thruster assembly 604 and an "off" or "closed" setting that cuts off propellant flow towards thruster assembly 604 (e.g., valve 616 may control propellant supply to thruster assembly 604). When valve 616 is open, propellant flows through orifices 618, 620 and into chamber 606. Orifices 618, 620 may be precisely formed to limit propellant flow into chamber 606 to a desired amount. In other examples, a single orifice may be used (or more than two orifices may be used). FIG. 6A also shows a high-pressure transducer 622 and a low-pressure transducer 624. High-pressure transducer 622 measures propellant pressure at propellant tank 602 (tank pressure). Low-pressure transducer 624 measures propellant pressure downstream of pressure regulator 614 (e.g., measures stepped-down pressure from pressure regulator 614). While transducers 622, 624 are shown as being outside propellant control assembly 610 in FIG. 6A, in some cases they may be considered components of a propellant control assembly. A fill/drain "F/D" valve 626 is connected to propellant tank 602 to allow filling and draining of propellant tank 602.

FIG. 6B illustrates an alternative example of a thruster system 630 (e.g., any of thrusters 404-415) that uses a liquid fuel and a liquid oxidizer. Liquid fuel is stored in propellant tank 632 (fuel tank) and liquid oxidizer is stored in propellant tank 634 (oxidizer tank). Fuel and oxidizer are generally used together to generate thrust and propel the satellite and may be referred to collectively, or individually, as "propellant." Thus, the terms "propellant" and associated terms like "propellant tank" are used broadly to include any liquid or gas used by a thruster and any tank used to contain such liquid or gas. Chamber 606 may be a combustion chamber in this example. Fuel may react with oxidizer (burn) in chamber 606 to produce thrust. While one propellant tank is used to store a single propellant in a thruster system such as shown in FIG. 6A, two propellant tanks are used to store the two propellants in a bipropellant thruster system such as thruster system 630. Aspects of the present technology may be applied to one, two, or more propellant tanks depending on the system.

Each propellant tank is coupled to thruster assembly 604 through a respective propellant control assembly. For example, propellant tank 602 is connected through propellant control assembly 610, which is similar to propellant control assembly 610 of FIG. 6A with a single orifice 618 (without orifice 620). Similar components are used and are similarly numbered. Propellant tank 632 is connected through propellant control assembly 640, which includes filter 642, pressure regulator 644, valve 646 and orifice 648. These components may be similar to components of propellant control assembly 610 or may be different according to the fuel and oxidizer used (e.g., pressure regulator 644 may be set to reduce pressure by a different amount to pressure regulator 614). High-pressure pressure transducer 652, low-pressure transducer 654 and fill/drain valve 656 are provided for the second propellant so that similar components are used on both sides in this example.

While thruster systems 600 and 630 are examples of thruster systems that may be used in satellite 400 (e.g., as one or more of thrusters 404-415) other thrusters may also be used and may also have a propellant tank and additional components (including propellant control components). For example, monopropellant thrusters, hall effect thrusters, ion thrusters, electrothermal thrusters, electromagnetic thrusters, and other thrusters may have one or more propellant tank and a propellant control assembly.

Components of a propellant control assembly (e.g., propellant control assemblies 610, 640) may be connected by gas lines (pipes, or tubes, which may also convey propellant in liquid form in some examples). Components may be connected together during assembly by screwing together, swaging, welding, soldering or otherwise coupling various components and gas lines. However, such assembly of numerous parts is prone to failure and may not be well suited to high-volume low-cost assembly (as may be required for some LEO satellites).

According to aspects of the present technology, a propellant tank is configured to accommodate one or more components (e.g., propellant control components) in a manner that may reduce the number of individual components, simplify manufacture, improve reliability and/or speed production and testing.

Figure 7:
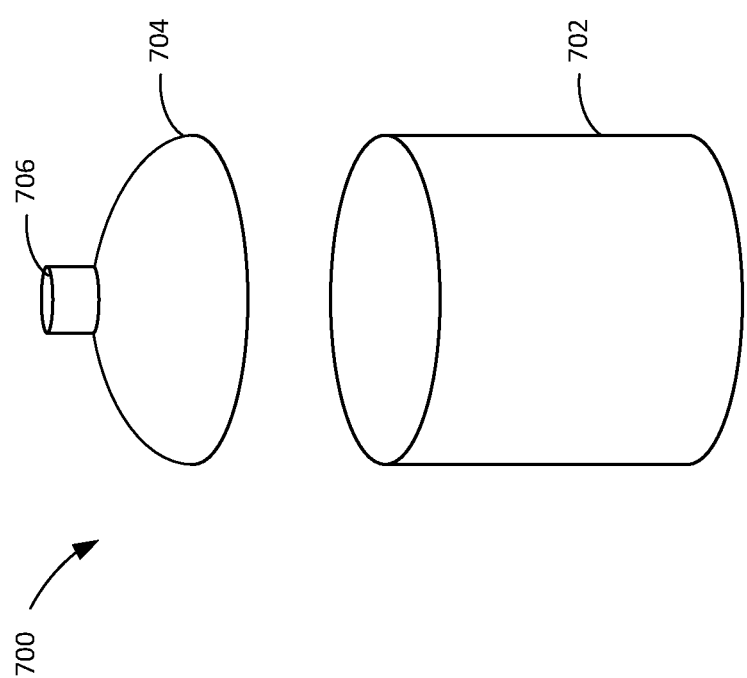
FIG. 7 shows an example of a propellant tank.

FIG. 7 shows an example of a propellant tank 700 that is formed of two parts, a tank body 702 and a dome 704. For example, tank body 702 may have a cylindrical shape and dome 704 may have a dome shape with a concave inner surface. Dome 704 may be welded or otherwise attached to tank body 702 during manufacturing to form propellant tank 700. Dome 704 includes a connection feature 706, which may include an opening into the interior of propellant tank 700 to allow flow of propellant (e.g., for filling propellant tank 700 and for delivery of propellant to a thruster assembly). Connection feature 706 may have a threaded portion to allow a fitting (e.g., pipe, tube, valve, T-joint, or other connector) to be connected to propellant tank 700 and thus allow propellant tank to be connected to a propellant control assembly (e.g., as shown in FIGS. 6A-B). In this arrangement, dome 704 includes a single high-pressure inlet/outlet and a propellant control assembly may be formed of individual components external to propellant tank 700.

According to an aspect of the present technology, one or more propellant control components may be integrated with a dome so that a propellant tank includes some or all components of propellant control assemblies shown above. Thus, rather than having a separate propellant control assembly external to a propellant tank, propellant control components may be integrated into the propellant tank thereby simplifying the thruster system.

Figure 8:
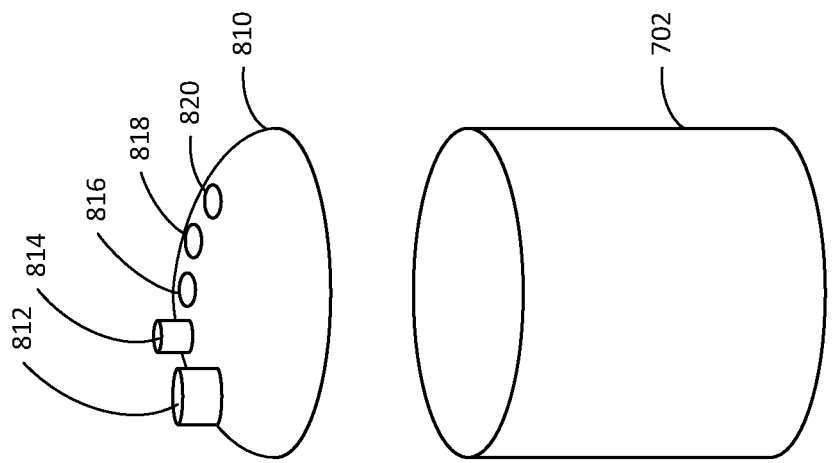
FIG. 8 shows an example of a propellant tank with dome a that includes certain propellant control components.

FIG. 8 shows an example of a propellant tank 800 that includes tank body 702 and a dome 810 that includes certain propellant control components. In contrast to the single connection feature 706 of FIG. 7, FIG. 8 shows multiple connection features 812, 814, 816, 818 and 820 for both high-pressure and low-pressure. For example, connection feature 812 may be a high-pressure connection feature with an opening directly to the interior of propellant tank 800 (e.g., as a fill/drain connection) and connection feature 814 may be another high-pressure connection feature that allows a high-pressure transducer to be connected to measure the pressure in propellant tank 800. Connection feature 814 may be directly connected to the interior of propellant tank 800 or one or more components may be between propellant tank 800 and connection feature 814 (e.g., one or more filter or other component). Connection feature 816 is a low-pressure connection feature to allow a low-pressure transducer to be connected to measure the pressure of propellant supplied downstream (e.g., to a thruster assembly). Because pressure regulation is performed in dome 810, low-pressure connection features are directly available from dome 801 and, in some cases, no further regulation of propellant pressure is needed. Connection features 818 and 820 may provide propellant directly to a thruster assembly without in-line propellant control components between propellant tank 800 and a thruster assembly. While FIG. 8 shows a specific example of connection features, it will be understood that the number and purpose of connection features may depend on thruster design (e.g., type of thruster, type of propellant, number of propellants used) and the present technology is not limited to any particular number of connection features or any specific assignment of connection features to different functions.

Figure 9:
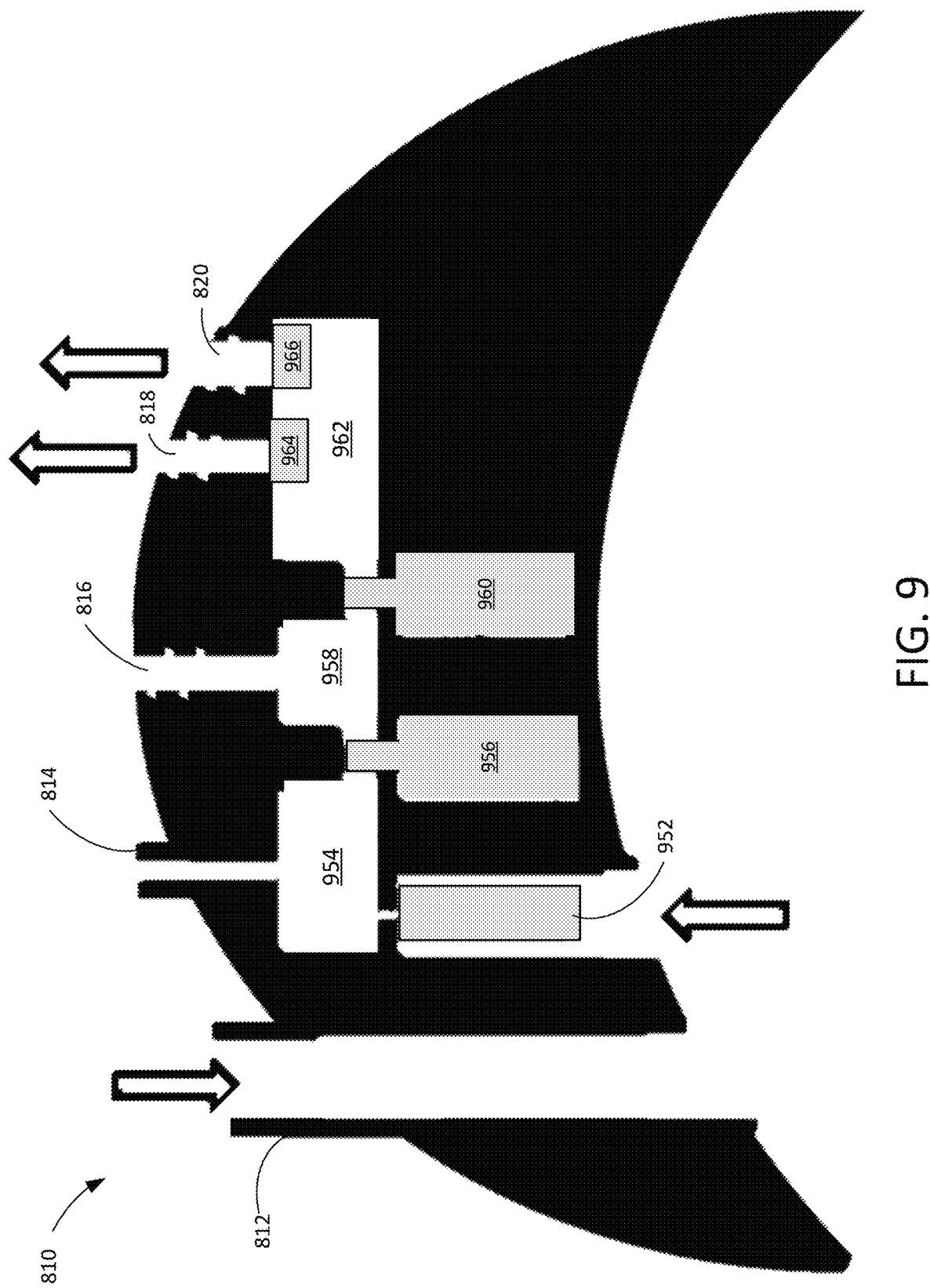
FIG. 9 shows an example of a propellant tank dome in cross-section including propellant control components.

FIG. 9 shows an example implementation of dome 810 in cross section. FIG. 9 includes arrows to show propellant flow. Connection feature 812 allows tank 800 to be filled and is formed by a flange that extends about an opening into the interior of tank 800. Propellant flows out of tank 800 through a filter 952 into a high-pressure manifold 954, which connects to connection feature 814. Connection feature 814 is formed of a flange that extends about an opening into high-pressure manifold 954 so that a pressure transducer connected to connection feature 814 can measure pressure in high-pressure manifold 954. Connection features 812 and 814 include flanges for attachment (e.g., welding) of corresponding fittings (e.g., a fill/drain valve and a high-pressure transducer respectively). In other examples, these connection features may be implemented differently (e.g., without a flange and with a threaded portion).

A pressure regulator 956 separates high-pressure manifold 954 from a low-pressure manifold 958 and reduces pressure from a higher pressure in high-pressure manifold 954 (approximately the pressure in propellant tank 800) to a lower pressure that is suitable for supplying to a thruster assembly. Connection feature 816 connects to low-pressure manifold 958 to allow a low-pressure transducer to be attached to measure pressure in low-pressure manifold 958. Connection feature 816 is an opening that has a threaded inner surface in this example. A valve 960 separates low-pressure manifold 958 from outlet manifold 962. Valve 960 may be an electrically-controlled valve that allows propellant to flow from low-pressure manifold 958 to outlet manifold 962 when open and prevents propellant from flowing when closed. Orifices 964 and 966 are provided between outlet manifold 962 and connection features 818 and 820 respectively. Orifices may limit propellant flow to connection features 818 and 820, which may be connected to a thruster assembly. Connection features 818 and 820 are openings that have threaded inner surfaces in this example. While the example of FIG. 9 shows connection features 812 and 814 for welded connection on the high-pressure side and connection features 816, 818 and 820 for threaded connection on the low-pressure side, these connections are for example purposes and various connections may be used with the present technology.

In some cases, propellant control components may be integrated into a propellant tank in an efficient manner, for example, by simplifying individual components prior to integrating them into a tank dome. Where a propellant control component that is provided as a discrete part for subsequent assembly may include a housing, propellant control components integrated into a tank dome may not require a separate housing. For example, such components may be placed or constructed in cavities that are sized to accommodate them so that the inner walls of such cavities may provide a housing (e.g., keeping elements of the components in place). Cavities in a tank dome may be customized according to the dimensions and other features of components that they are to accommodate so that the components may be simplified for integration with the tank dome. This may reduce weight and cost and reduce risk of leaks and other failures.

Figure 10:
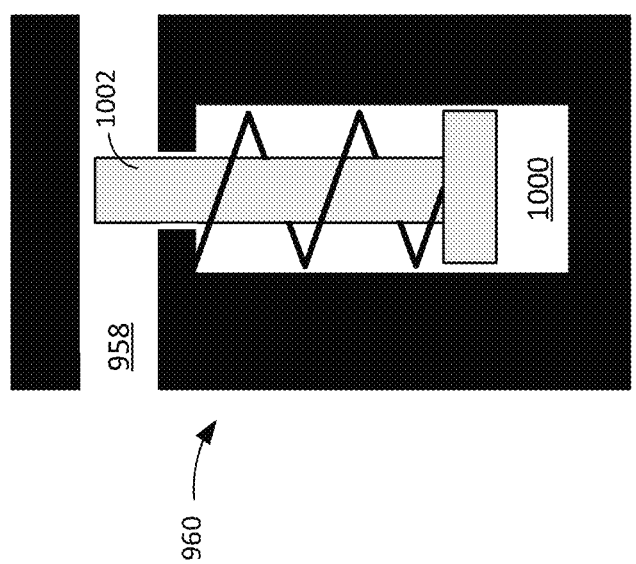
FIG. 10 shows an example of a valve formed in a cavity.

FIG. 10 shows a cross sectional view of certain features of an implementation of valve 960 formed in a cavity 1000 in dome 810 that is configured to accommodate valve features. For example, poppet 1002 may fit within cavity 1000 with sufficient clearance to allow poppet 1002 to slide between open and closed positions. In this way, the walls of cavity 1000 may act as a poppet guide and no other housing is needed for valve 960. No threaded (or other) coupling is needed to connect valve 960 because both valve 960, low-pressure manifold 958 and outlet manifold 962 are formed integrally within dome 810. It will be understood that a valve may include various components that are not shown in FIG. 10 (e.g., an electrical or other actuator) that may also be accommodated in cavity 1000. Similarly, cavities for other propellant control components may be customized to accommodate those components in an efficient way (e.g., as integrated components that do not require separate housings or threaded or other connectors).

An example of a method of forming a tank dome with integrated propellant control components uses additive manufacturing (which may also be referred to as 3D printing) to form the tank dome with cavities of appropriate sizes to accommodate propellant control components and form manifolds through which propellant may flow.

Figure 11A:
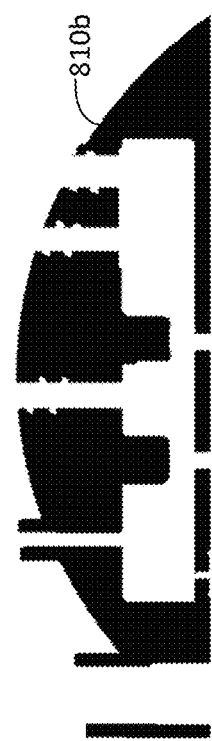
FIGS. 11A-D show an example of forming a dome of a propellant tank using additive manufacturing.

FIG. 11A shows a cross sectional view of a lower portion 810a of dome 810. Lower portion 810a may be formed by additive manufacturing of a suitable material (e.g., titanium, aluminum, stainless steel, or other material) using an appropriate additive manufacturing system for additive manufacturing of metal parts (e.g., commercially available systems from Stratasys or EOS).

Figure 11C:
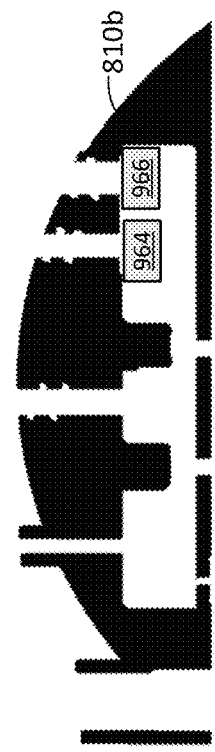
Figure 11B:
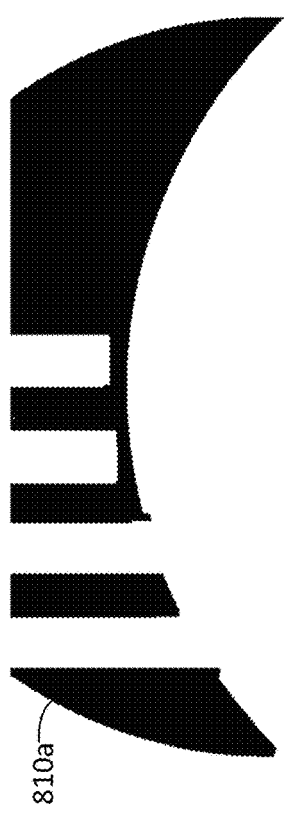

FIG. 11B shows lower portion 810a with propellant control components, including filter 952, pressure regulator 956 and valve 960 in corresponding cavities. These components may be complete prior to being inserted in respective cavities or may be built in-place from individual parts (e.g., without housings).

FIG. 11C shows a cross sectional view of an upper portion 810b of dome 810. Upper portion 810b may be formed by additive manufacturing of a suitable material (e.g., titanium, aluminum, stainless steel, or other material, which may be the same material as used for lower portion 810a) using an appropriate additive manufacturing system for additive manufacturing of metal parts (e.g., commercially available systems from Stratasys or EOS).

Figure 11D:
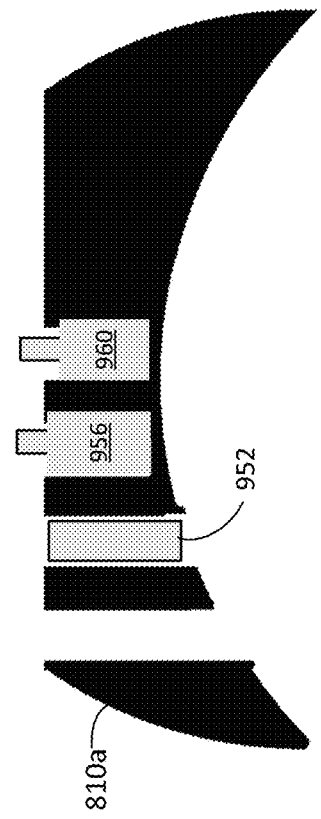

FIG. 11D shows upper portion 810b with propellant control components, including orifice 964 and orifice 966 in corresponding cavities. Upper portion 810b may be aligned with lower portion 810a and the two portions brought together and joined (e.g., welded together) to form dome 810 as shown in FIG. 9. Dome 810 may be joined (e.g., welded) to tank body 702 (at the same time or at a different time) to form propellant tank 800.

While the example shown in FIGS. 11A-D shows both portions of tank dome 810 formed by additive manufacturing, in other examples, only one portion may be made by additive manufacturing and another one or more portions may be made by another technique (e.g., a simpler portion that does not require features formed by additive manufacturing may be forged or machined metal). In other examples, a tank dome may be formed of more than two portions and any one or more such portions may be made by additive manufacturing or otherwise.

Figure 12A:
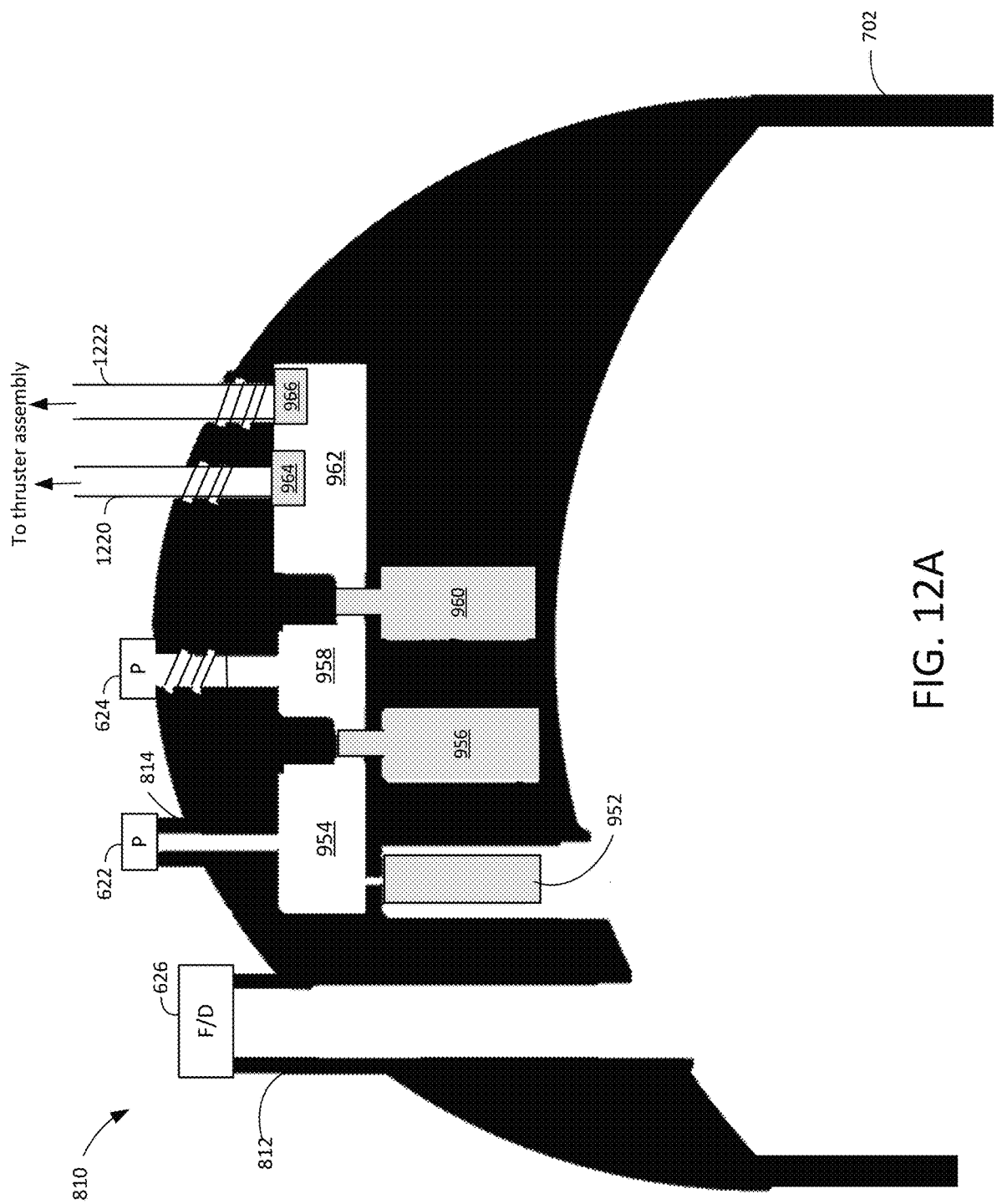
FIG. 12A-B show examples of propellant tank domes that include propellant control components.

FIG. 12A shows dome 810 after manufacturing (e.g., after welding of lower portion 810a and upper portion 810b to enclose propellant control components) and after attachment (e.g., welding) to tank body 702 (only a part of tank body 702 is visible in this view). Fill/Drain valve 626 is attached (e.g., welded) to connection feature 812 to allow filling of tank 800 and high-pressure transducer 622 is attached (e.g., welded) to connection feature 814 to measure pressure in high-pressure manifold 954. Low-pressure transducer 624 is attached to dome 810 by a threaded connection so that it can measure pressure in low-pressure manifold 958. Gas lines 1220 and 1222 are attached to dome 810 by threaded connections so that propellant can flow out of outlet manifold 962, through orifices 964, 966, to a thruster assembly.

Figure 12B:
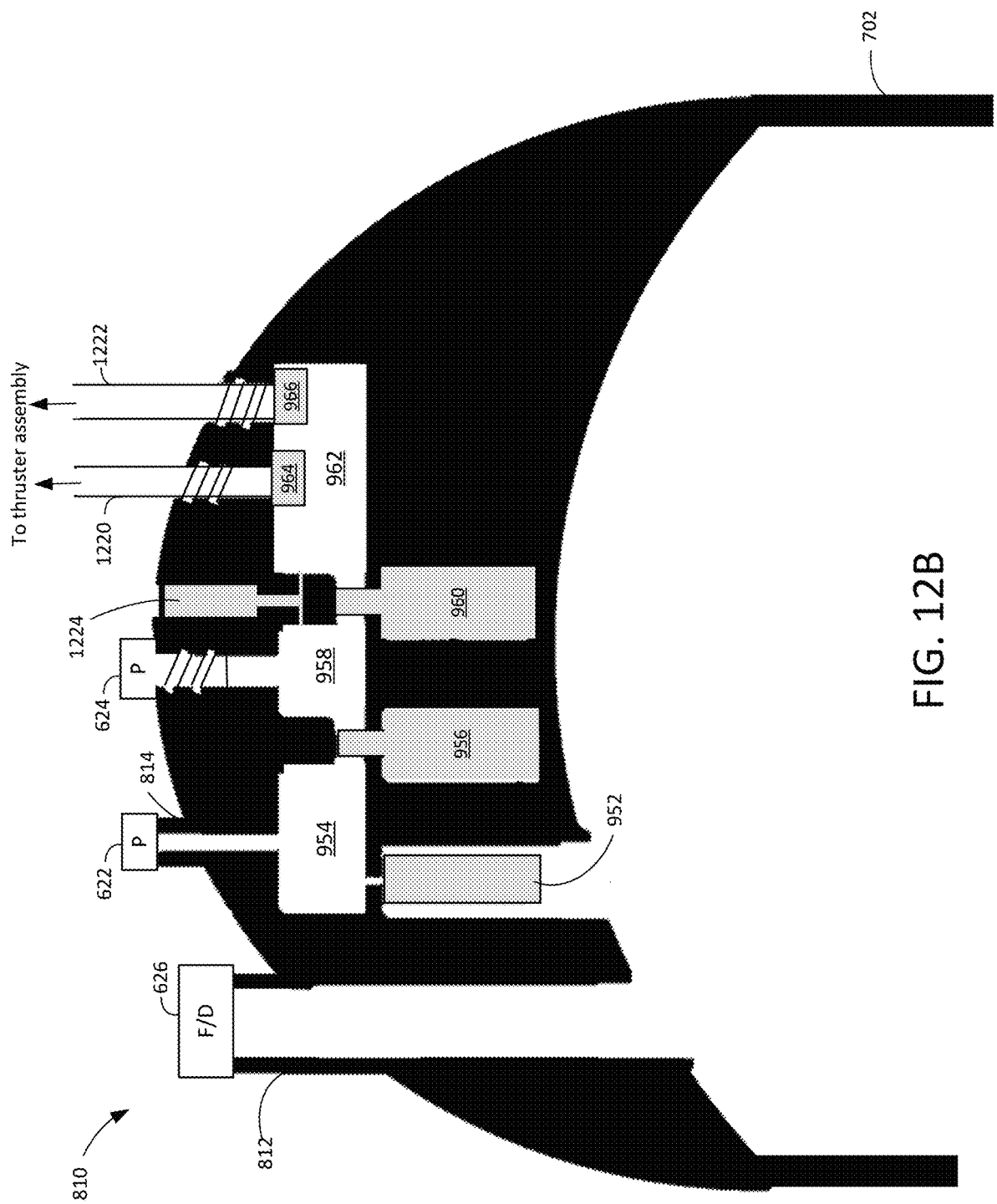

FIG. 12B shows another embodiment that includes components previously shown in FIG. 12A with the addition of valve 1224 in parallel with valve 960 (between low-pressure manifold 958 and outlet manifold 962). Valve 1224 may be a pressure relief valve that may prevent high pressure build up in low-pressure manifold 958 and/or outlet manifold 962 (e.g., by venting gas (e.g., to exterior of dome 810) when pressure in low-pressure manifold 958 and/or outlet manifold 962 exceeds a predetermined maximum pressure).

The shape and dimensions of dome 810 may be adapted in a variety of ways according to requirements. For example, to save weight, dome 810 may be formed with one or more cavities (not shown in the figures) that do not contain propellant but are open to the outside. In some examples, a number of cavities may be formed in a honeycomb arrangement (or other strong light structure). In some examples, the outer surface of dome 810 may be shaped to reduce the amount of material used while still enclosing the features shown.

Figure 13:
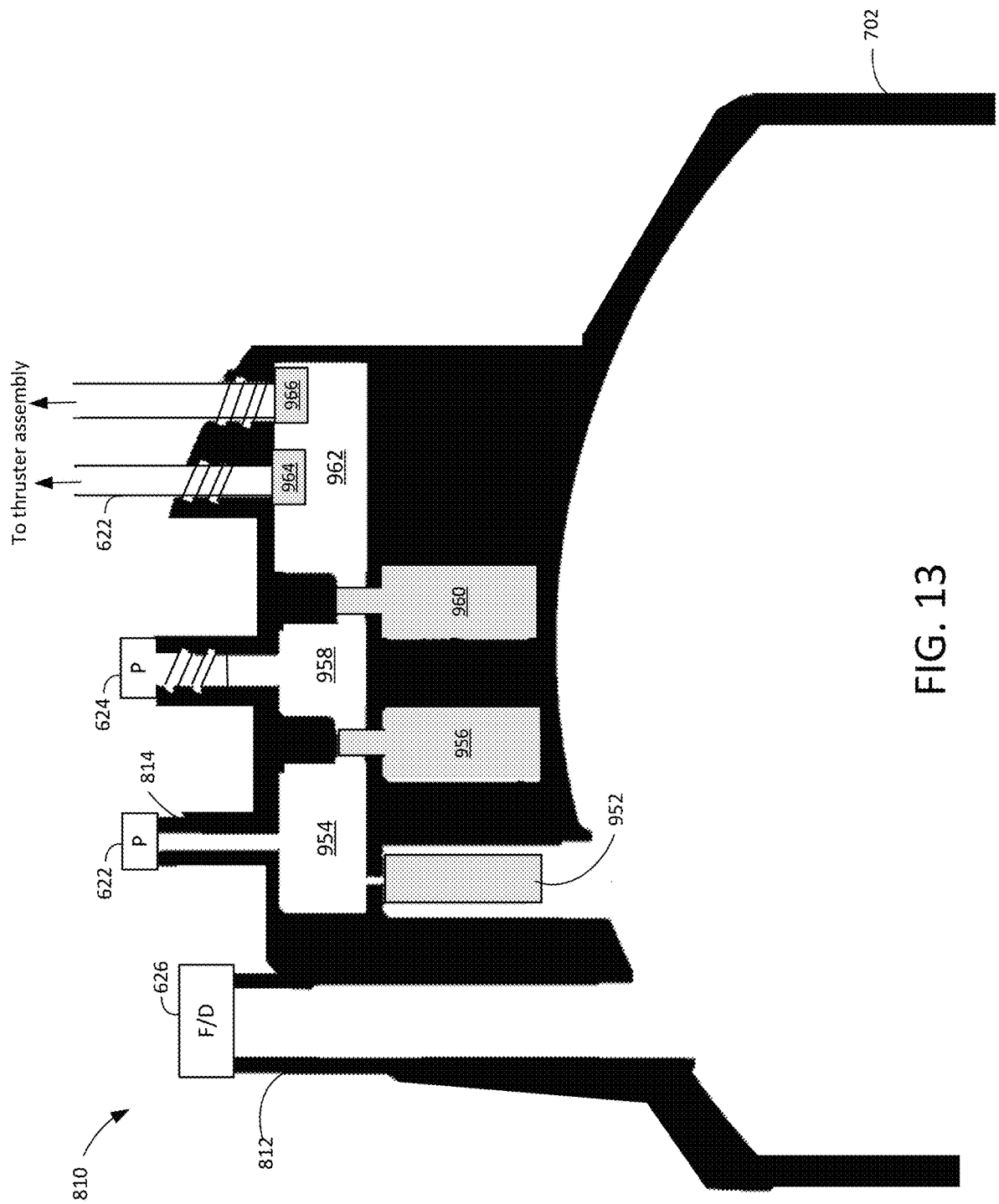
FIG. 13 shows an example of a propellant tank dome that includes propellant control components.

FIG. 13 shows an example of dome 810 with reduced material. It will be understood that, using additive manufacturing allows a wide variety of shapes to be manufactured and that a wide variety of different shapes and configurations may be used with the present technology. The locations and orientations of propellant control components and manifolds is not limited to those shown in the Figures and it will be understood that these components may be arranged in any suitable manner.

Figure 14:
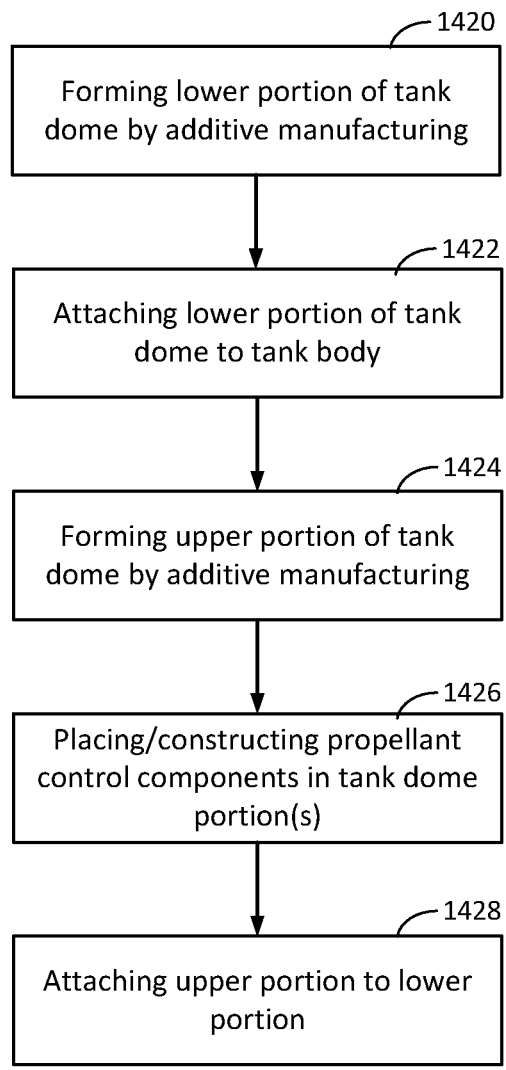
FIG. 14 shows an example of a method that includes additive manufacturing.

FIG. 14 shows a method of manufacturing a propellant tank including forming a lower portion of a tank dome by additive manufacturing 1420 (e.g., lower portion 810a), attaching (e.g., welding) the lower portion of the tank dome to a tank body 1422, and forming an upper portion of the tank dome by additive manufacturing 1424 (e.g., upper portion 810b). The method further includes placing/constructing propellant control components in tank dome portion(s) 1426 (e.g., as illustrated in FIGS. 11B and 11D). Propellant control components (e.g., filters, pressure regulators, valves and orifices) may be complete prior to placement or may be constructed in-place from parts (e.g., poppets, springs, etc.). After placing or constructing propellant control components in tank dome portions, the method includes attaching (e.g., welding) the upper portion to the lower portion 1428. The order of the steps may be different to the order indicated in FIG. 14. For example, attaching the lower portion of the tank dome to the tank body may occur after attaching the upper portion to the lower portion and the upper portion may be formed before or at the same time as formation of the lower portion.

Figure 15:
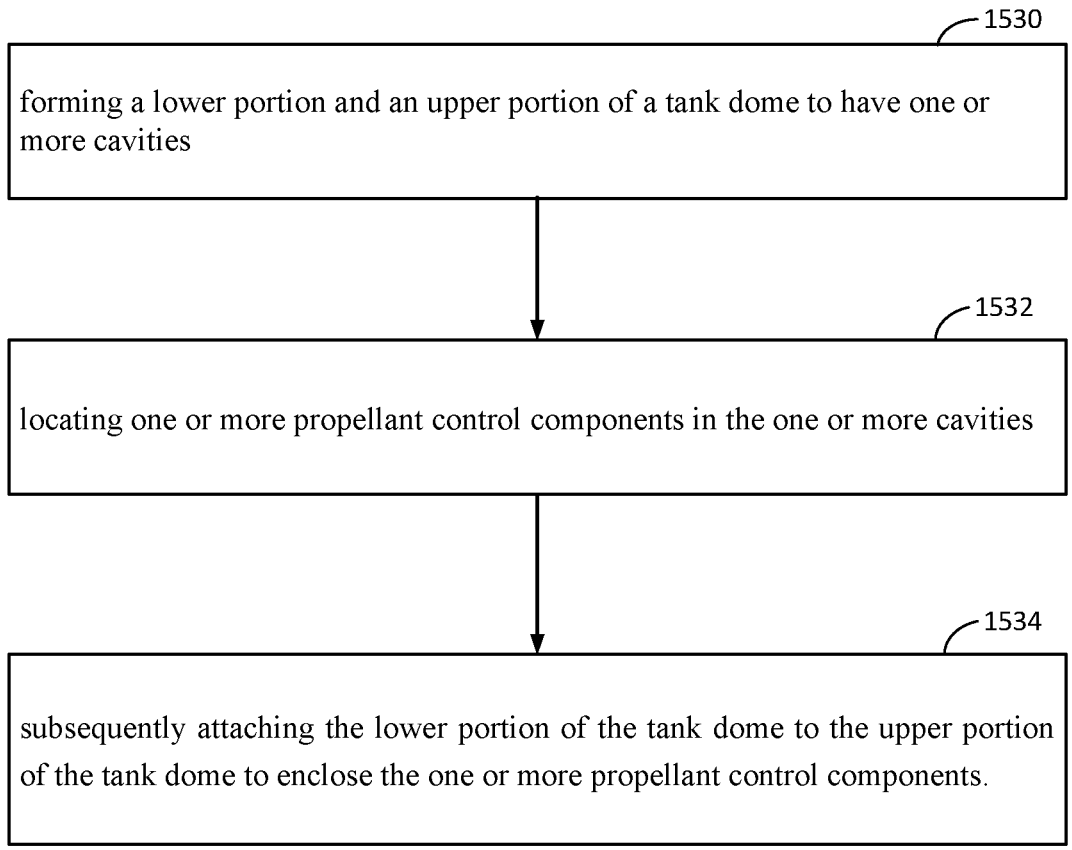
FIG. 15 shows an example of a method of forming a tank dome.

FIG. 15 shows an example of a method of forming a satellite propellant tank that includes forming a lower portion and an upper portion of a tank dome to have one or more cavities 1530 (e.g., cavities in one or both portions) and locating one or more propellant control components in the one or more cavities 1532. The method includes subsequently attaching the lower portion of the tank dome to the upper portion of the tank dome to enclose the one or more propellant control components 1534 (e.g., attaching lower portion 810a and upper portion 810b to enclose propellant components 952, 956 and 960 as shown in FIGS. 11A-12B).

An example of a satellite propellant tank includes a tank body; a dome attached to the tank body to enclose an interior volume for propellant storage; one or more cavities formed in the dome; and one or more propellant control components located in the one or more cavities formed in the dome.

The one or more propellant control components may include at least one of: a pressure regulator, a valve, a filter or an orifice. The one or more propellant control components may include a pressure regulator. The pressure regulator may be configured to reduce pressure from a tank pressure to a reduced pressure for supply to one or more thrusters. The one or more propellant control components may include a valve to control propellant supply to one or more thrusters. The one or more cavities may include a high-pressure manifold, a low-pressure manifold that is connected to the high-pressure manifold by a pressure regulator, and an outlet manifold that is connected to the low-pressure manifold by a valve. A high-pressure transducer may be attached to the high-pressure manifold and a low-pressure transducer may be attached to the low-pressure manifold. The dome may be formed of an upper portion and a lower portion, the upper portion welded to the lower portion and the lower portion welded to the tank body. The one or more cavities may be located in the lower portion and the propellant control components may be located in the one or more cavities are enclosed by the upper portion.

An example method of forming a satellite propellant tank includes forming a lower portion and an upper portion of a tank dome to have one or more cavities; locating one or more propellant control components in the one or more cavities; and subsequently attaching the lower portion of the tank dome to the upper portion of the tank dome to enclose the one or more propellant control components.

Forming the lower portion and the upper portion may include forming at least one of the lower portion or the upper portion using additive manufacturing. Locating the one or more propellant control components in the one or more cavities may include constructing at least one propellant control component in a cavity. The at least one propellant control component may be a valve that is constructed from components that include a poppet, the cavity having dimensions to enable the poppet to slide between an open position and a closed position using walls of the cavity as a poppet guide. The method may include attaching the tank dome and a tank body to enclose an interior of the satellite propellant tank. The method may include attaching two or more pressure transducers to the tank dome to measure pressures including pressure in a high-pressure manifold in the tank dome and pressure in a low-pressure manifold in the tank dome.

An example satellite thruster system includes a propellant tank that has an interior volume for storage of propellant; one or more satellite thrusters connected to the propellant tank to receive propellant from the propellant tank; and a plurality of propellant control components located along a propellant flow pathway between the interior volume and the one or more satellite thrusters, one or more of the plurality of propellant control components are located in cavities located in a portion of the propellant tank.

The one or more of the plurality of propellant control components located in the cavities may include a filter, a pressure regulator and a valve. The one or more of the plurality of propellant control components may further include a pressure relief valve. The one or more satellite thrusters may be ion thrusters and the propellant may be one or more of xenon, krypton or argon.

Note that the discussion above introduces many different features and many embodiments. It is to be understood that the above-described embodiments are not all mutually exclusive. That is, the features described above (even when described separately) can be combined in one or multiple embodiments.

For purposes of this document, it should be noted that the dimensions of the various features depicted in the Figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope of be defined by the claims appended hereto.

What is claimed is:

1. A satellite propellant tank, comprising:
a tank body;
a dome attached to the tank body to enclose an interior volume for propellant storage, the dome formed of an upper portion and a lower portion, the upper portion welded to the lower portion and the lower portion welded to the tank body;

one or more cavities formed in the dome; and one or more propellant control components located in the one or more cavities formed in the dome.

2. The satellite propellant tank of claim 1, wherein the one or more propellant control components include at least one of: a pressure regulator, a valve, a filter or an orifice.

3. The satellite propellant tank of claim 1, wherein the one or more propellant control components include a pressure regulator.

4. The satellite propellant tank of claim 3, wherein the pressure regulator is configured to reduce pressure from a tank pressure to a reduced pressure for supply to one or more thrusters.

5. The satellite propellant tank of claim 1, wherein the one or more propellant control components include a valve to control propellant supply to one or more thrusters.

6. The satellite propellant tank of claim 1, wherein the one or more propellant control components include a filter to remove particles from propellant supplied to one or more thrusters.

7. The satellite propellant tank of claim 1, wherein the one or more cavities include a high-pressure manifold, a low-pressure manifold that is connected to the high-pressure manifold by a pressure regulator, and an outlet manifold that is connected to the low-pressure manifold by a valve.

8. The satellite propellant tank of claim 7, further comprising a high-pressure transducer attached to the high-pressure manifold and a low-pressure transducer attached to the low-pressure manifold.

9. The satellite propellant tank of claim 1, wherein the one or more cavities are located in the lower portion and the propellant control components located in the one or more cavities are enclosed by the upper portion.

10. A method of forming a satellite propellant tank comprising:

forming a lower portion and an upper portion of a tank dome to have one or more cavities;

locating one or more propellant control components in the one or more cavities; and subsequently attaching the lower portion of the tank dome to the upper portion of the tank dome to enclose the one or more propellant control components.

11. The method of claim 10, wherein forming the lower portion and the upper portion includes forming at least one of the lower portion or the upper portion using additive manufacturing.

12. The method of claim 10, wherein locating the one or more propellant control components in the one or more cavities includes constructing at least one propellant control component in a cavity.

13. The method of claim 12, wherein the at least one propellant control component is a valve that is constructed from components that include a poppet, the cavity having dimensions to enable the poppet to slide between an open position and a closed position using walls of the cavity as a poppet guide.

14. The method of claim 10 further comprising attaching the tank dome and a tank body to enclose an interior of the satellite propellant tank.

15. The method of claim 14 further comprising attaching two or more pressure transducers to the tank dome to measure pressures including pressure in a high-pressure manifold in the tank dome and pressure in a low-pressure manifold in the tank dome.

16. A satellite thruster system comprising:

a propellant tank formed of a tank body and a dome attached to the tank body to enclose an interior volume for storage of propellant, the dome formed of an upper portion and a lower portion, the upper portion welded to the lower portion and the lower portion welded to the tank body with cavities formed between the upper portion and the lower portion of the dome;

one or more satellite thrusters connected to the propellant tank to receive propellant from the propellant tank; and a plurality of propellant control components located along a propellant flow pathway between the interior volume and the one or more satellite thrusters, one or more of the plurality of propellant control components are located in the cavities.

17. The satellite thruster system of claim 16, wherein the one or more of the plurality of propellant control components located in the cavities includes a filter, a pressure regulator and a valve.

18. The satellite thruster system of claim 17, wherein the one or more of the plurality of propellant control components further includes a pressure relief valve.

19. The satellite thruster system of claim 16, wherein the one or more satellite thrusters are ion thrusters and the propellant is one or more of xenon, krypton or argon.

* * * * *